(12) United States Patent
Taskin et al.

(10) Patent No.: US 7,248,831 B1
(45) Date of Patent: Jul. 24, 2007

(54) REMOTE SYSTEM STATUS MONITORING AND SOFTWARE RECOVERY ON WIRELESS BRIDGES

(75) Inventors: Metin Ismail Taskin, Mountain View, CA (US); David S. Stephenson, San Jose, CA (US); David P. Bokaie, Pleasanton, CA (US); Lazar Lvovsky, Concord, CA (US); Tae Kyoon Jang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 431 days.

(21) Appl. No.: 10/801,971

(22) Filed: Mar. 15, 2004

(51) Int. Cl.
*H04B 3/36* (2006.01)
(52) U.S. Cl. ............... 455/8; 455/9; 455/420
(58) Field of Classification Search ........... 455/3.01, 455/3.02, 418–420, 7–9; 725/62, 63
See application file for complete search history.

(56) References Cited

U.S. PATENT DOCUMENTS

| | | | | |
|---|---|---|---|---|
| 5,541,840 | A * | 7/1996 | Gurne et al. .......... | 701/33 |
| 5,724,645 | A * | 3/1998 | Na ...................... | 455/3.02 |
| 5,966,638 | A * | 10/1999 | Mita et al. ........... | 455/3.06 |
| 6,731,946 | B1 * | 5/2004 | Stanwood et al. ...... | 455/517 |
| 6,771,930 | B2 * | 8/2004 | Buer .................. | 455/13.4 |
| 7,102,513 | B1 * | 9/2006 | Taskin et al. .......... | 340/540 |
| 2002/0032028 | A1 * | 3/2002 | Kaupe .................. | 455/427 |
| 2004/0229562 | A1 * | 11/2004 | Wren et al. ........... | 455/3.02 |

OTHER PUBLICATIONS

"Release Notes for Cisco Aironet 1410 Bridges for Cisco IOS Release 12.2(11)JA", Jun. 2003, Copyright 2003 Cisco Systems, Inc.
"Release Notes for Cisco Aironet 1410 Bridges for Cisco IOS Release 12.2(11)JA1", Jul. 21, 2003, Copyright 2003 Cisco Systems, Inc.
"Release Notes for Cisco Aironet 1410 Bridges for Cisco IOS Release 12.2(11)JA2", Aug. 8, 2003, Copyright 2003 Cisco Systems, Inc.

* cited by examiner

*Primary Examiner*—Nguyen T. Vo
(74) *Attorney, Agent, or Firm*—Beyer Weaver LLP

(57) ABSTRACT

Disclosed are methods and apparatus for an inside bridge component to monitor the status of an outside unit (ODU) of a wireless bridge and to then handle a faulty ODU and/or faulty cable continuity with the ODU. A mechanism is provided for determining whether the inside component is coupled to a valid ODU prior to the inside component powering up the ODU. Mechanisms are also provided for the inside component to initiate a configuration or software recovery in the ODU. After a valid ODU is powered up, mechanisms are also provided for monitoring the cable continuity between the inside component and the ODU and removing the power from the ODU when the cable continuity is out of specification.

33 Claims, 10 Drawing Sheets

Figure 7A: Injector Status LED

| Steady Green | ODU passed POST and Loaded software image |
|---|---|
| Blinking Green | DC power applied, ODU is loading software or going through POST |
| Blinking Amber | ODU is not discovered, DC power not applied. |
| Steady Amber | Recovery button is pressed more than 2 second and less than 20 sec, ODU is in Configuration recovery mode |
| Steady red | Recovery button was pressed more than 20 sec, ODU is in Image recovery mode, downloading new image. |

Figure 7B: Power LED

| Black | No DC power is applied to SPIER |
|---|---|
| Steady green | DC power is applied to SPIER |

REMOTE SYSTEM STATUS MONITORING AND SOFTWARE RECOVERY ON WIRELESS BRIDGES

BACKGROUND OF THE INVENTION

The present invention relates to methods and apparatus for facilitating use of wireless computer networks. More specifically, it relates to monitoring the status of bridges used in such wireless networks and software recovery for such bridges.

A wireless network typically includes two or more processing nodes which communicate through their own respective bridge devices. That is, a first node is coupled to a first bridge and a second node is coupled to a second bridge. Each bridge is also configured to receive signals from the other bridge via an internal or external antenna. For example, a first node sends a signal through its own bridge and antenna, which then wirelessly transmits the signal to a second node's bridge's antenna. Each bridge generally processes signals received and transmitted by their respective nodes.

A typical bridge includes one or more indoor components and one or more outdoor units (ODU's) which each include an antenna. The indoor units are in communication with the ODU and include one or more processing nodes for communicating with other remote processing nodes via the ODU and its antenna. Typically, the inside components include an intermediary device which provides a network interface between the various inside components and the ODU. When a communication failure occurs between the inside components and the ODU, a technician must then interface directly with the ODU or connections between the ODU and the inside components since a failure typically results in the disabling of the network interface between the inside components and the ODU.

Since the ODU is not easily accessible due to its outside location (e.g., the ODU typically installed on a roof, mast or tower), it would be desirable to monitor the ODU status and handle any failures (e.g., reset the ODU configuration and load new software) using the inside components, e.g., the intermediary inside device. This remote access to the ODU is especially desirable in the event of a failure where the user cannot communicate with the ODU through a network interface. It is also desirable to verify the cable continuity between the ODU and the inside components since a majority of the failures with the ODU are due to cable failures between the inside components and the ODU.

SUMMARY OF THE INVENTION

Accordingly, the present invention provides methods and apparatus for an inside bridge component to monitor the status of an outside unit (ODU) of a wireless bridge and to then handle a faulty ODU and/or faulty cable continuity with the ODU. A mechanism is provided for determining whether the inside component is coupled to a valid ODU prior to the inside component powering up the ODU. This determination prevents other components which do not comply with the current bridge network from being powered up while coupled to such network. Such a noncompliant component may present a nonconforming load problem and cause failure of the network connection, as well as damage other coupled network components. Mechanisms are also provided for the inside component to initiate a configuration or software recovery in the ODU. After a valid ODU is powered up, mechanisms are also provided for monitoring the ODU system status and the cable continuity between the inside component and the ODU and removing the power from the ODU when the cable continuity is out of specification.

In one embodiment, a method for managing a first component of a wireless network using a second component of the wireless network is disclosed. When a configuration recovery mode is selected manually at the second component without accessing a network interface of the second component, a configuration signal is sent from the second component to the first component. The configuration signal specifies that the first component is to perform a reconfiguration. In a further aspect, when the configuration signal is sent by the second component to the first component, it is determined whether the first component has successfully completed the reconfiguration and an indication as to whether the first component has successfully completed the reconfiguration is displayed at the second component.

In one implementation, the reconfiguration includes loading a factory default configuration into the first component. In another implementation, when an image recovery mode is selected manually at the second component without accessing the network interface of the second component, an image recovery signal is sent from the second component to the first component. The image recovery signal specifies that the first component is to initiate an operation for downloading new software to the first component. In a further aspect, when the image recovery signal is sent by the second component to the first component, it is determined whether the first component has successfully initiated the new software download operation and an indication as to whether the first component has successfully initiated the new software download operation is displayed at the second component. In one aspect, the new software download operation includes downloading new software from the second component to the first component.

In a specific embodiment, the manual selection of the configuration recovery mode is performed by pressing a recovery button for a first time period and the manual selection of the image recovery mode is performed by pressing a recovery button for a second time period which differs from the first time period. In one implementation, the configuration signal is a periodic signal sent for a time period corresponding to the pressing of the recovery button for the first time period and the image recovery signal is a periodic signal sent for a time period corresponding to the pressing of the recovery button for the second time period.

In another embodiment, the configuration recovery mode and image recovery mode may only be manually selected during a powering up of the second component. In a further implementation, upon powering up the second component, power is disabled from being injected from the second component to the first component and sending a discovery signal to the first component. After the discovery signal is returned by the first component to the second component, power is injected from the second component into the first component. After the discovery signal is sent to the first component and when the discovery signal is not returned by the first component, the power to the first component continues to be disabled. The configuration signal is sent by maintaining the discovery signal for a first time period after injecting power into the first component and the image recovery signal is sent by maintaining the discovery signal for a second time period after injecting power into the first component. Finally, when power has been injected into the second component and (i) when the configuration recovery mode and the image recovery mode are not selected manually or (ii) after the configuration signal is sent in the form of the discovery signal, the discovery signal is removed from being sent to the first component.

In one aspect, the first and second time periods for maintaining the discovery signal correspond to a time for which the configuration mode or image recovery mode is manually selected, respectively. After the discovery signal is removed, a second discovery signal is sent from the second component to the first component which is not detectable by the first component. When the second discovery signal is not returned to the second component, an indication that the first component has completed its initialization procedures is displayed at the second component.

In another aspect, after injecting power into the first component, at the second component the connection between the first and second component is monitored. When a failure is detected in the connection between the first and second components, power injection is then disabled from the second component to the first component. In a further aspect, an indication that power to the first component has been disabled is displayed at the second component.

In another embodiment, the invention pertains to a first apparatus operable to manage a second apparatus of a wireless network. The first apparatus includes one or more processors and one or more memory. At least one of the memory and processors are adapted to provide at least some of the above described method operations. In a specific implementation, at least one of the processors and memory are further adapted for running Ethernet signals on outdoor rated coaxial cables coupled to the first apparatus, wherein the outdoor rated coaxial cables are also coupled to the second apparatus. In a further aspect, the at least one of the processors and memory are further adapted for converting Ethernet signals coming from an indoor network device coupled to the first apparatus through a Cat5 into Ethernet signals on outdoor rated coaxial cables. In a specific implementation, the outdoor rated coaxial cables are 75 ohm CaTV type coax cables. In a further implementation, the at least one of the processors and memory are further adapted for transmitting and receiving data on the outdoor rated coaxial cables at a rate selected from a group consisting of 10 Mbps, 100 Mbps, 1 Gbps, and 10 Gbps.

In yet a further embodiment, the invention pertains to a computer program product for managing a first component of a wireless network using a second component of the wireless network. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 7A is a table illustrating the various states of an Status LED (Light Emitting Diode) of the SPIER in accordance with one embodiment of the present invention.

FIG. 7B is a table listing the configurations of the power LED of the SPIER in accordance with one implementation of the present invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
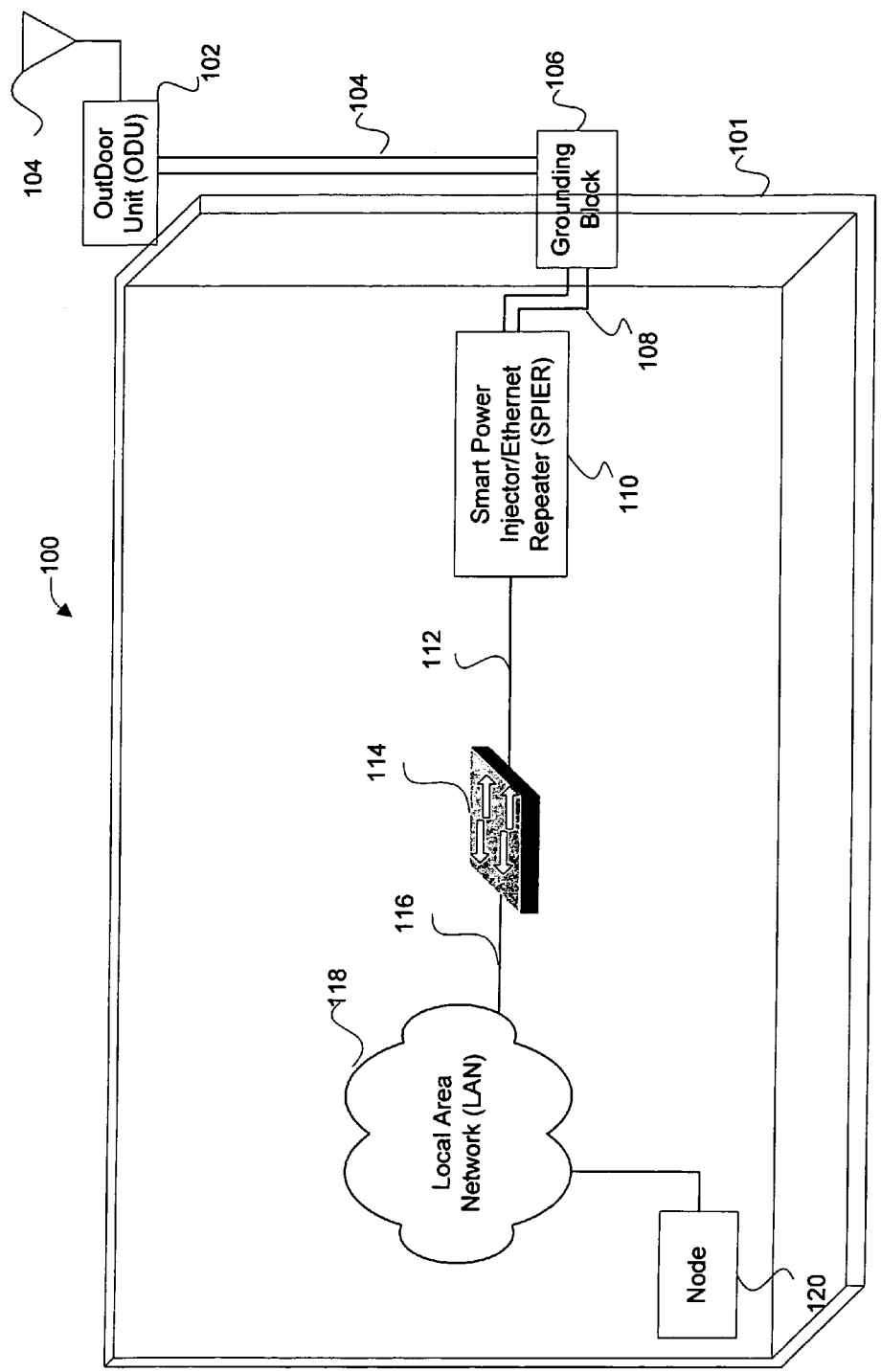
FIG. 1 is a diagrammatic representation of a bridge which is installed at a first location in accordance with one embodiment of the present invention.

FIG. 1 is a diagrammatic representation of a bridge which is installed at a first location 100 in accordance with one embodiment of the present invention. In general, a particular bridge includes an internal or external antenna for receiving and transmitting signals wirelessly between nodes on the bridge's network and other remote nodes which are on another network which is not coupled to the particular bridge. The bridge also includes or is coupled to a device for processing signals received by the antenna and for transmitting signals out from the antenna to another remote network.

In the illustrated configuration, an antenna 104 is coupled to an outdoor unit (ODU) 102 which is attached to the outside of a building 101. Alternatively, the ODU 102 may be located at a position detached from the building 101. An antenna and ODU 102 may also be positioned inside a building if an optimum received signal strength is obtainable.

The ODU 102 may be coupled to a grounding block 106 through one or more coaxial cables 104. The ODU 102 generally receives and processes signals from the antenna 104, and the grounding block 106 generally provides grounding for coaxial cable 104 for lightning protection of the building 101. In one example, the grounding block 106 grounds the coaxial cable 104 shield to the building 101. As shown, the grounding block 106 is inserted through a wall of the building 101 to thereby couple the ODU 102 to a smart power injector/Ethernet repeater (SPIER) 110 via one or more coaxial cables 108.

The SPIER 110 generally receives power, such as a DC voltage input from a power adaptor (not shown), and injects that power into one or more coax cables 108 to power up the ODU 102. The SPIER may also operate as an Ethernet repeater between the ODU 102 and internal LAN 118. In one implementation, SPIER 110 contains an unmanaged five port Ethernet switch chip. The chip includes both MAC and PHY layers. SPIER 110 receives Ethernet packets from the LAN interface, checks CRC and transmits the correctly received packets to the ODU 102 through the coaxial cable interface 108. By way of examples, the SPIER 110 can transmit and receive data for 10 Mbps, 100 Mbps, 1 Gbps, or 10 Gbps on the coaxial cable interface 108. Similarly, packets received from the ODU interface are transmitted to the internal LAN 118 through a Cat5 cable interface 112.

In a specific embodiment, the coaxial cable interface 108 includes CATV type coaxial cables which are outdoor rated and have coaxial connectors, such as F type connectors, which are easily sealable from outside elements, such as rain. For example, the coaxial cable interface 108 includes 75 ohms CATV coaxial cables. This arrangement-allows Ethernet signals to be run between the ODU and the SPIER without the need for expensive outdoor rated Cat5 cables and connectors. Additionally, the design of the ODU is simplified since F type outdoor rated connectors are very easy to weather seal.

Of course, any suitable cables or wires may be utilized between the various components of the bridge and depends on the particular application. In one implementation, two coaxial cables are used, where one is used for received signals and the other is used for transmitted signals.

The SPIER 110 may also be coupled to a router or switch 114 which forwards data to one or more nodes 120 of local area network (LAN) 118. Although only a single node 120 is illustrated in FIG. 1, the LAN 118 may include any number of nodes having the same or different functions. For example, a first node may be operable to provide an HTTP interface, while a second node is operable to provide an interface for managing the various components of the bridge, e.g., SPIER 110 and ODU 102.

The bridge may be defined as including any number of components for facilitating communication between a first network and another remote network (or plurality of networks). Although the term "bridge" is used herein interchangeably with the term "ODU", it should be understood that the bridge can include additional components, such as antenna 104, SPIER 110, grounding block 106, and router 114. Additionally, although the term "ODU" refers to an "outdoor unit", the bridge and its antenna may be placed inside a building in certain configurations.

Figure 2:
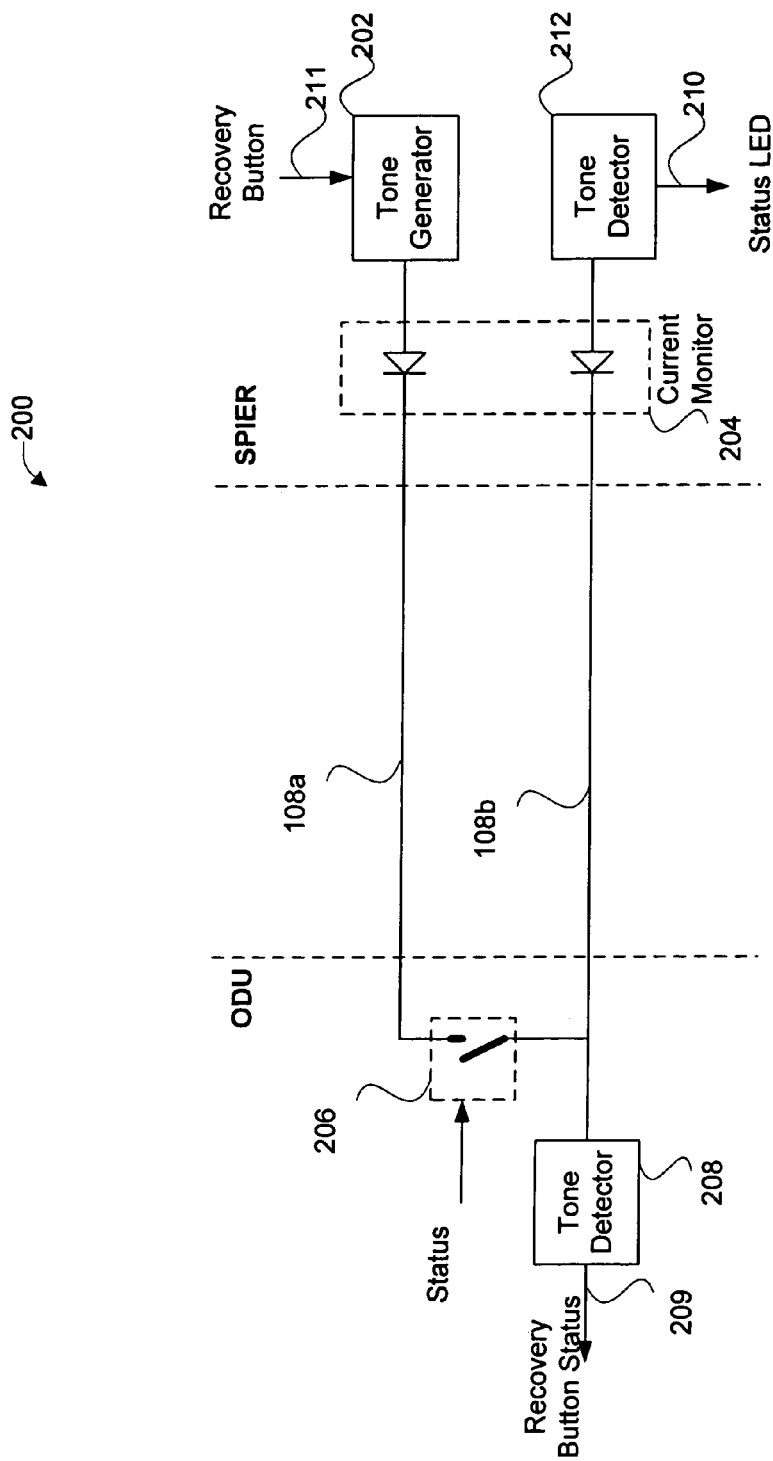
FIG. 2 is a diagrammatic representation of an interface between the ODU (outdoor unit) and SPIER (Smart Power Injector Ethernet Repeater) of FIG. 1 in accordance with one embodiment of the present invention.

FIG. 2 is a diagrammatic representation of an interface 200 between the ODU 102 and SPIER 110 of FIG. 1 in accordance with one embodiment of the present invention. As shown, the ODU includes relay 206 which is activated by status signal 205. In one embodiment, the relay 206 provides a mechanism for the SPIER to detect whether it is coupled to a valid ODU (which contains the relay). In one embodiment, the relay 206 is kept closed when the ODU is not receiving any power from the SPIER. The SPIER may then send a signal through one of the coaxial cables 108 and then detect the returned signal on the other coaxial cable to thereby determine that the ODU contains a closed relay as expected. The relay 108 may also be used to indicate completion of power up procedures by the ODU. For instance, the ODU opens the relay after the ODU completes a number of initialization procedures which are performed upon start up of the ODU.

The ODU may also include a tone detector 208 linked to a recovery button status line 209. In general, this tone detector 208 provides a mechanism through which the SPIER may initiate a configuration or image recovery (e.g., new software is download to the ODU) for the ODU. In one embodiment, a configuration recovery is initiated when the SPIER sends a detectable signal or tone to one of the coaxial cables 108 of the ODU and an image recovery is initiated by a different detectable signal being sent to one of the coaxial cables 108. In a specific implementation, a configuration recovery is initiated by a continuous, periodic tone being sent by the SPIER on cable 108a for longer than 2 seconds and less than 20 seconds, while an image recovery is initiated by a continuous, periodic tone being sent for longer than 20 seconds. Of course, any suitable time ranges or signal types may be implemented. Alternatively, two different signal profiles may be used to initiate two different recovery modes, such as two signals having different frequencies or duty cycles. Also, the ODU may be triggered into only the configuration recovery or only the image recovery.

In the case where a continuous, periodic tone is used by the SPIER to initiate the configuration and image recovery modes of the ODU, the tone detector 208 of the ODU is operable to detect a continuous tone. However, in order for the SPIER to detect when the relay is open (even after power up of the ODU), the SPIER may then be operable to send a tone which is also not detectable by the tone detector 208 of the ODU. In one implementation, the SPIER sends a discontinuous tone (e.g., 50% duty cycle pulse) after power up of the ODU and the tone detector 208 has a time constant which prevents detection of such discontinuous tone. In this implementation, the tone detector 208 of the ODU is formed from a simple envelope detector and a low pass filter.

The SPIER may also include current monitor block 204 for monitoring the current on coaxial cables 108a and 108b. During normal mode operation of the ODU (e.g., after power up and set up of the ODU), the current on the coaxial cables may be monitored by the SPIER to determine whether any continuity failures occur. As described further below, when a continuity failure occurs, steps may then be initiated to deter further damage to the components of the bridge network, such as shutting down the ODU.

The SPIER may also include a tone generator 202 for generating a tone signal on one of the coaxial cables 108a to determine whether a valid ODU is coupled to the SPIER prior to powering up the ODU, initiate a configuration or image recovery by the ODU, and/or determine whether the relay of the ODU has closed after power up of the ODU. Generation of such tone signal may be at least partly based on a mechanical interface, such as a recovery button 211. In the illustrated implementation, this mechanical interface 211 allows one to initiate a configuration or image recovery in the ODU even when network communication with the ODU is not functioning properly.

The configuration and image recovery modes may be initiated by pressing the recovery button for a particular period of time upon reset of the SPIER. When pressed for a first period of time, configuration recovery is initiated. When pressed for a second period of time, image recovery is initiated. In one implementation, the different periods of times result in different period of times for applying the continuous, periodic tone signal to the ODU. A discontinuous tone (which is not detectable by the ODU) may be used to determine when the ODU relay is open. Thus, in one implementation, the tone generator 202 includes components for selectively generating a continuous and discontinuous tone. One example of such a tone generator is a 400 kHz oscillator The SPIER may also include a tone detector 212 for detecting a tone being returned on coaxial cable 108b via relay 206 and coaxial cable 108a. In the above described implementation examples, the tone detector 212 is capable of detecting both continuous and discontinuous tones. One example of such a tone generator is a 400 kHz oscillator.

Figure 3:
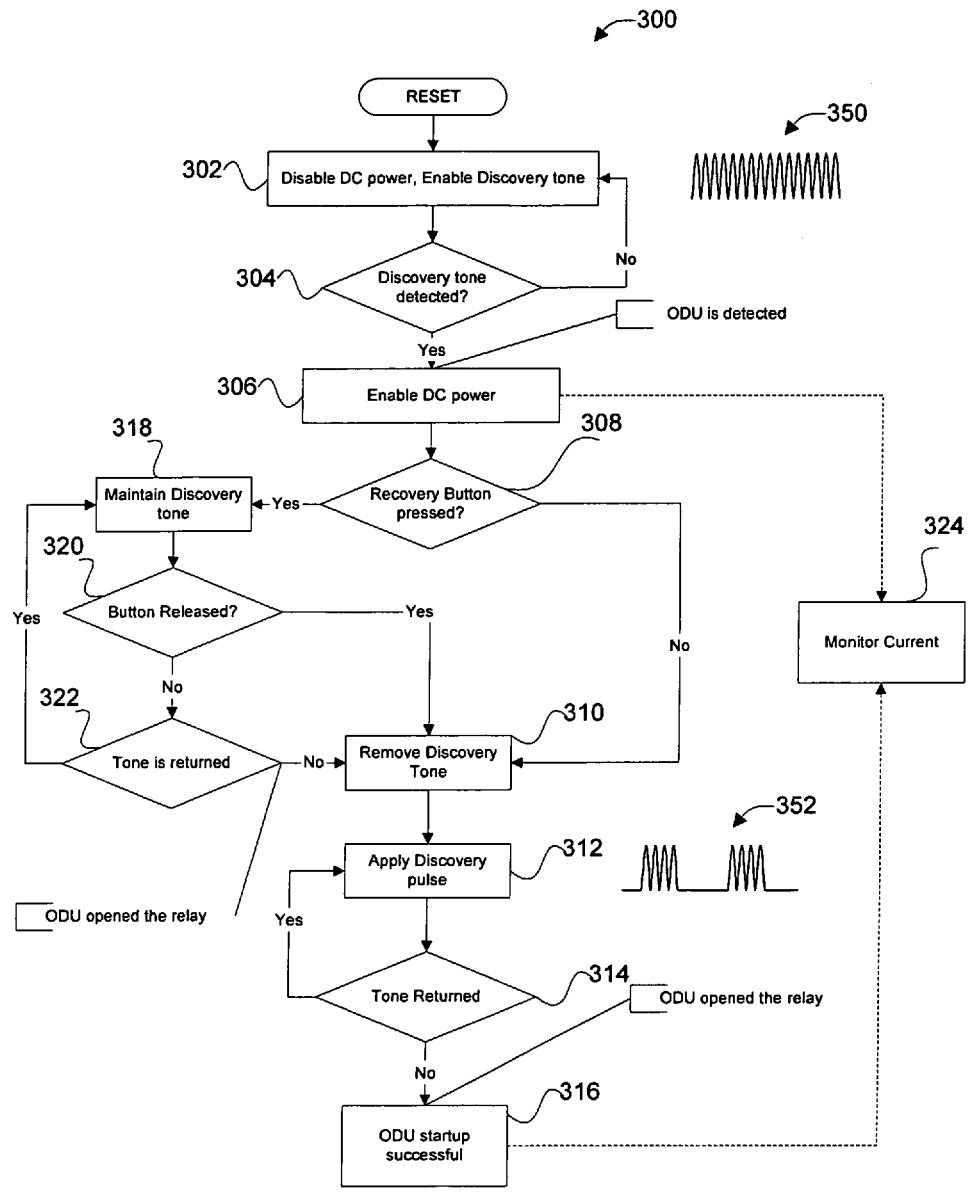
FIG. 3 is a flowchart illustrating a procedure for injecting power to the ODU and initiating a configuration or image recovery in accordance with one embodiment of the present invention.

FIG. 3 is a flowchart illustrating a procedure 300 for injecting power to the ODU and initiating a configuration or image recovery in accordance with one embodiment of the present invention. In one implementation, techniques for injecting power to the ODU and initiating a configuration and/or image recovery in the ODU are implemented by the SPIER 110. Although the techniques of the present invention are described as being implemented by the SPIER 110 of FIG. 1, they may be implemented by any combination of hardware and software or any number and type of components.

Referring to the illustrated example of FIG. 3, upon a reset of the SPIER power is disabled and a discovery tone is enabled in operation 302. The discovery tone may be any suitable tone or signal which can pass through the relay 206 (when it is closed) of the ODU, be returned to the SPIER, and then is detectable by the SPIER. As shown, one example of a discovery tone is continuous, periodic signal 350. This discovery tone is output (e.g., by tone generator 202) onto one of the coaxial cables (e.g., 108a) by the SPIER 110 towards ODU 102.

The SPIER then determines whether the discovery tone has been detected in operation 304, e.g., by tone detector 210 of the SPIER 110. The discovery tone will only be detected when the SPIER is actually connected to an ODU having a relay 206 and such relay 206 is closed. Thus, if the discovery tone is detected by the SPIER, it can be determined that the SPIER is coupled to a powered down ODU having a relay. When the discovery tone is detected by the SPIER (e.g., when the ODU's relay is closed), the power is enabled in operation 306. That is, the SPIER applies or injects power into the two coaxial cables 108 to thereby power up the ODU.

When the discovery tone is not detected, the SPIER continues to enable the discovery tone and disable the power in operation 302. In this case, the SPIER determines that it is not coupled to a valid ODU having a relay which is closed. Thus, the SPIER does not power up an invalid component which does not have a closed relay. Since the SPIER does not inadvertently power up invalid components, the SPIER is not likely to inject power into a component which has been accidentally coupled to the coaxial connectors. This feature can prevent damage to such invalid components. Additionally, since power is injected by the SPIER only after connection to a valid ODU, this prevents live coaxial cables from creating sparks prior to connecting to the ODU.

It may then be determined whether the recovery button 211 of the SPIER 110 has been pressed in operation 308. During normal operation, the recovery button is not pressed, and the discovery tone is then removed in operation 310. A discovery pulse is then applied to one of the coaxial cables 108 in operation 312. The SPIER generally uses the discovery pulse to determine whether the ODU has completed its initialization procedures. In the illustrated example of FIG. 3, the discovery pulse may be in the form of a half duty periodic signal 352, which is not detectable by the tone detector 208 of the ODU which has a rather long time constant. Of course, any suitable signals may be used for this purpose, besides a pulse tone. Whether the pulse tone is detectable or not detectable by the ODU, such pulse tone does not initiate a configuration or image recovery.

It is then determined whether the discovery pulse is returned in operation 314. Since the ODU continues to keep the relay 206 in a closed position until it completes startup procedures, the discovery pulse continues to be returned until such startup procedures are complete. After the ODU completes startup, the relay is opened by the ODU and the pulse tone is not returned to the SPIER (e.g., to coaxial cable 108b). When the pulse tone is not returned in operation 314, it is then determined that the ODU startup procedure is successful in operation 316. This operation 316 may also include visually (or audibly) indicating that the ODU has completed its initialization procedures, e.g., via specifically configured LED's as further described below.

The SPIER may also be operable to initiate a reconfiguration of the ODU. One mechanism for initiating a reconfiguration of the ODU is accomplished by pressing a recovery button on the SPIER. When the recovery button is pressed in operation 308, the discovery tone is maintained in operation 318. The discovery tone is detectable by the ODU and maintained to indicate to the ODU that it is to perform a configuration recovery. Alternatively, a different signal than the discovery tone which is detectable by the ODU may be applied by the SPIER to the ODU to indicate configuration recovery should be performed by the ODU.

The SPIER can also indicate to the ODU that it proceed with an image recovery and download new software by sending a particular signal to the ODU. In one implementation, a first type of signal may be used to indicate a configuration recovery, while a second type of signal indicates an image recovery. In the illustrated embodiment, the SPIER indicates different recovery modes by applying the discovery tone to the ODU for different durations. In a specific implementation, an application of the discovery tone for greater than 2 seconds and less than 20 seconds indicates that the ODU should perform a configuration recovery, while an application of the discovery tone for greater than 20 seconds indicates that the ODU should perform an image recovery.

In one embodiment, the discovery tone may be applied to the ODU as long as the recovery button is pressed and removed when the recovery button is released. In this implementation, it is then determined whether the recovery button has been released in operation 302. If the button has been released, the discovery tone is then removed in operation 310. The SPIER then applies a discovery pulse until it is not returned by the ODU in operations 312 through 314, similar to the final steps in the normal mode as described above. This process allows the SPIER to determine and then indicate (e.g., via specifically configured LED's) whether the ODU has completed its initialization procedures which follow a configuration or image recovery.

If the recovery button is not released, it is then determined whether the discovery tone has been returned in operation 322. The discovery tone may cease to be returned when the ODU opens its relay after it is ready to perform an image recovery, as well as other initialization procedures. When the discovery tone is returned, the ODU has not completed its recovery and initialization procedures and, thus, the discovery tone continues to be maintained in operation 318. The discovery tone is applied until either the relay of the ODU is opened or the discovery button is released. After which, the SPIER proceed with operations to apply a discovery pulse as in the normal mode procedure. The discovery pulse may not be detectable by the ODU so that ODU continues with its initialization procedures. The discovery pulse may be applied as a mechanism to verify that the ODU has completed initialization procedures.

Figure 4A:
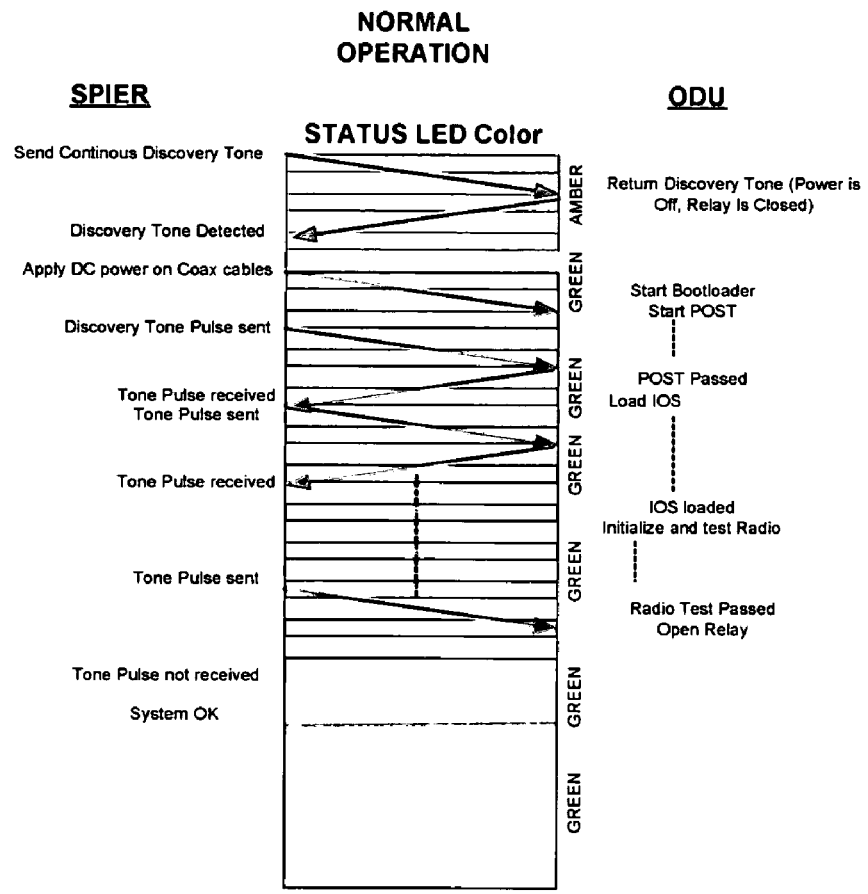
FIGS. 4A-4C are colorized communication diagrams which illustrate three possible interaction modes between the SPIER and ODU in accordance with one implementation of the present invention.
Figure 4B:
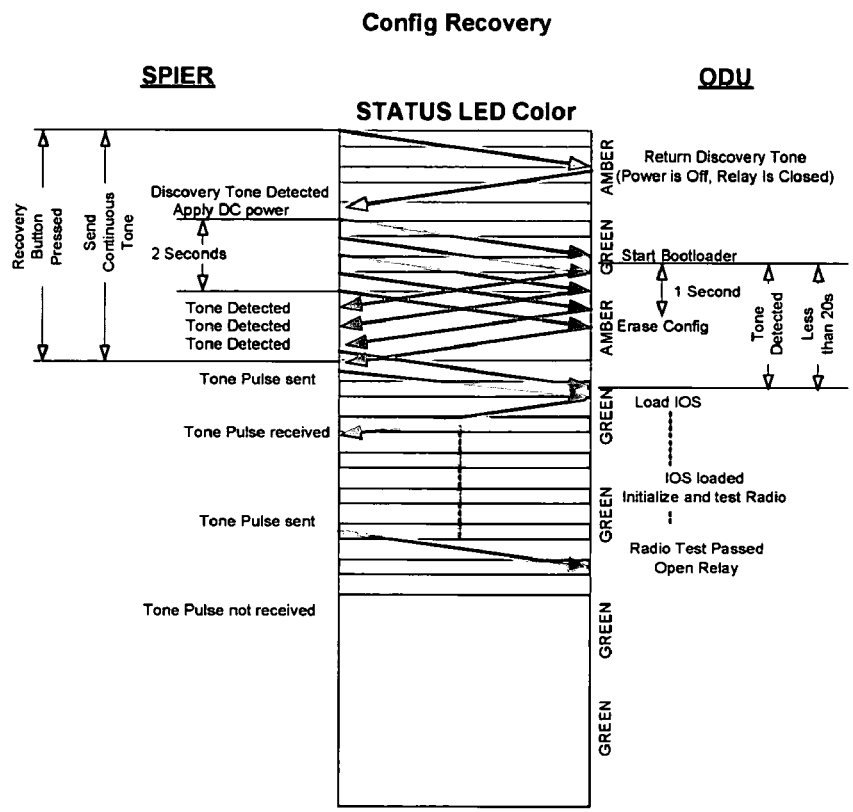
Figure 4C:
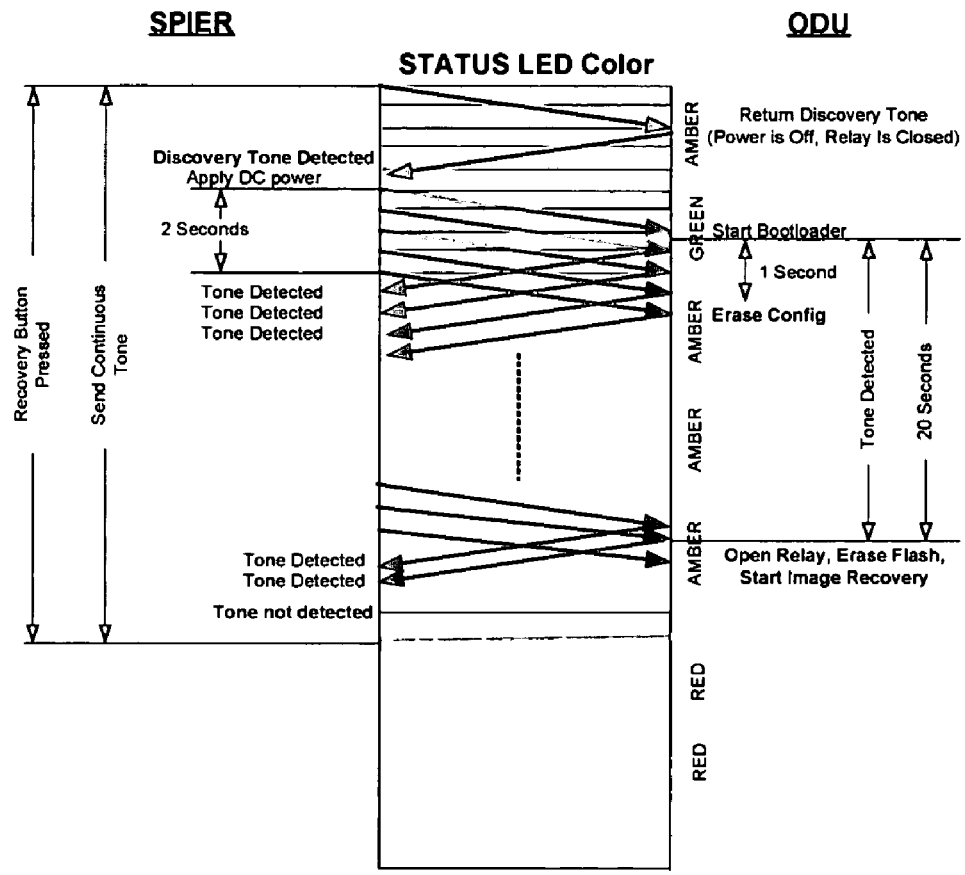
Figure 5:
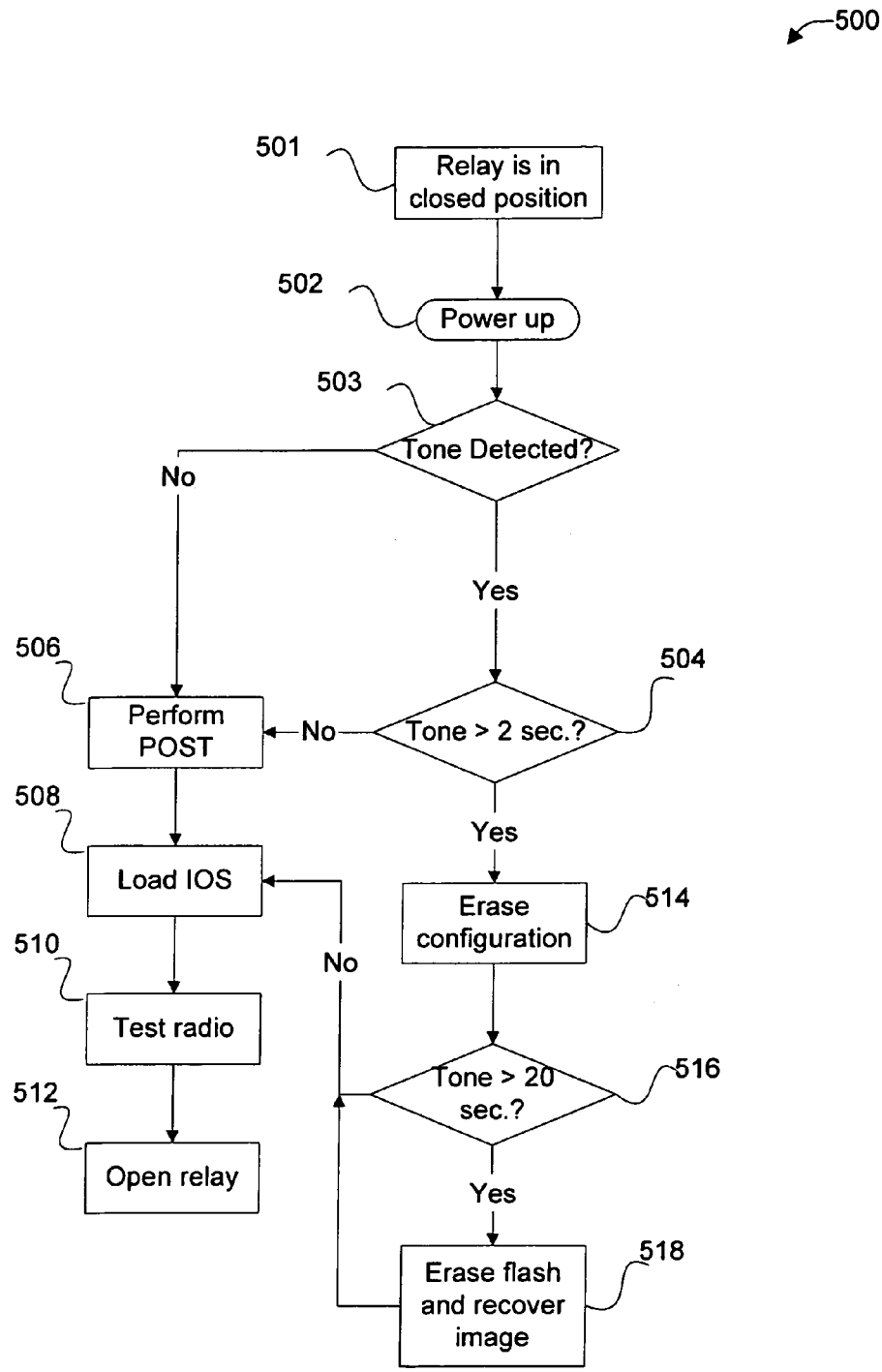
FIG. 5 is a flowchart illustrating a procedure for powering up an ODU in accordance with one embodiment of the present invention.

FIGS. 4A-4C are colorized communication diagrams which illustrate three possible interaction modes between the SPIER and ODU in accordance with one implementation of the present invention. Different steps in each mode's procedure may also be indicated by a specific visual or audible display, such as a specific LED configuration. One implementation for configuring a Status LED associated with the SPIER is illustrated as colored bands to represent a blinking Status LED or a solid color to represent a steady, unblinking LED in FIGS. 4A through 4C. These FIGS. 4A-4C will also be described in relation to the SPIER procedure of FIG. 3. FIG. 5 is a flowchart illustrating a procedure 500 for powering up an ODU in accordance with one embodiment of the present invention, which figure will also be described in conjunction with FIGS. 4A-4C and FIG. 3.

FIG. 4A illustrates a normal mode procedure for powering up the ODU in accordance with one embodiment of the present invention. Initially, the SPIER sends a continuous discovery tone to ODU (e.g., in operation 302 of FIG. 3). While this continuous discovery tone is sent by the SPIER and a discovery tone is not detected at the SPIER, the SPIER status LED has a blinking amber color. The discovery tone will not be returned unless the SPIER is coupled to a specially configured ODU which includes a relay that is closed. Thus, if the discovery tone is not detected by the SPIER, the discovery tone continues to be sent and the power disabled in operation 302.

When an ODU in the powered down mode, its relay is closed in operation 501 of FIG. 5. When this type of ODU is coupled to the SPIER, the ODU returns the discovery tone to the SPIER via its ODU relay as illustrated in FIG. 4A. When the SPIER detects the returned discovery tone, power is then applied to the coaxial cables between the SPIER and the ODU (e.g., operation 306 of FIG. 3). During this power up procedure, the status LED of the SPIER blinks green instead of amber to indicate that the ODU is being powered up.

Referring to FIG. 5, when the ODU is powered up in operation 502, it is then determined whether a tone is detected in operation 503 at the ODU. In a normal operation mode, the SPIER does not have its recovery button pressed and the discovery tone is removed in operation 310 of FIG. 3. Instead, the discovery pulse is applied to the ODU in operation 312 of FIG. 3. Since the ODU cannot detect the discovery pulse, the ODU goes on to perform its normal mode procedures. For example, a "power on self test" (POST) is performed in operation 506. The operating software (or software) is loaded in operation 508, and the radio is tested in operation 510.

After these initialization procedures (e.g., if the initialization process is successful), the relay is opened at the ODU in operation 512. In the meantime as shown in FIG. 4A, the SPIER sends a tone pulse to the ODU while the ODU proceeds through its initialization procedures. During these operations, the status LED of the SPIER continues to blink green. The SPIER continues to receive the tone pulse until the relay of the ODU is opened. After the relay is opened, the tone pulse is then not received. It may then be determined that the ODU system has successfully completed its normal initialization. The status LED of the SPIER then outputs a steady green color to indicate that the ODU system's initialization is successful.

FIG. 4B illustrates a configuration recovery mode in accordance with one embodiment of the present invention. In this mode, the SPIER still applies a discovery tone and when the discovery tone is detected, applies power to the ODU. However, when the recovery button of the SPIER has been pressed during a power up of the SPIER, the SPIER continues to send the continuous tone to the ODU after power up of the ODU. When the continuous tone is sent to the ODU for more than two seconds in operation 504 of FIG. 5, the ODU then erases its configuration in response to receipt of the continuous tone duration of more than 2 seconds in operation 514. The SPIER indicates a configuration recovery has been initiated by displaying a steady amber color on the Status LED.

After the recovery button is released, the SPIER then removes the discovery tone and sends a pulse tone (e.g., operations 320, 310, and 312) to the ODU. During this phase, a blinking green color is displayed on the SPIER Status LED as shown in FIG. 4B.

The ODU determines whether the discovery tone has been received for more than 20 seconds. For example, the ODU tracks the duration of the discovery tone once it is powered up and determines whether the discovery tone is greater than 20 seconds. If the discovery tone has been received for less than 20 seconds (e.g., the recovery button has been released within 20 seconds and the discovery tone removed by the SPIER within 20 seconds), the ODU proceeds through its initialization procedures and opens its relay in operations 508 through 512 of FIG. 5. As a result, the pulse tone is not returned to the SPIER as shown in FIG. 4B. When the pulse tone is not returned in operation 314 of FIG. 3, the SPIER then determines that the ODU's configuration and initialization process is successful (e.g., operation 316 of FIG. 3). The SPIER then displays a solid green color as shown in FIG. 4B to indicate that the ODU initialization has successfully completed.

FIG. 4C illustrates an image recovery mode in accordance to one implementation of the present invention. As shown, the continuous discovery tone is applied by the SPIER to the ODU (e.g., operation 302 of FIG. 3). After the continuous discovery tone is returned, the SPIER then applies power to the ODU (e.g., operation 306). A blinking amber color is displayed on the SPIER Status LED until the discovery tone is returned. Sometime during these operations, the recovery button is pressed and held down for longer than 20 seconds. During powering up of the ODU, the SPIER displays a blinking green color on the Status LED.

After power up, the ODU then starts its boot loader procedures. However, since the continuous tone is greater than two seconds, the ODU erases its configuration in operation 514. Additionally, since the continuous tone continues past 20 seconds, the ODU also erases its flash (non-volatile memory) and initiates an image recovery in operation 518. The ODU may also complete its initialization procedures in operations 508 and 510 and open its relay. The ODU is now set up for receiving a new software download. Meanwhile, the SPIER displays a solid amber color to indicate that a recovery has been initiated for the ODU.

As shown in FIG. 3, the continuous tone is applied until the recovery button is released in operation 320 or the recovery tone is not returned in operation 322. For an image recovery, the recovery button is pushed for longer than 20 seconds. In this example, the continuous tone is applied until the ODU has commenced image recovery and opened the relay. Since the relay is now open, the SPIER then fails to detect the discovery tone in operation 322. The status LED of the SPIER then displays a steady red color to indicate that the image recovery has been initialized as shown in FIG. 4C. After the image recovery has been initiated, software may then be downloaded into the ODU, e.g., via a network port of the ODU.

Generally, the techniques for powering up or initiating a recovery of the ODU may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic or configured to interface with a network device.

Figure 6:
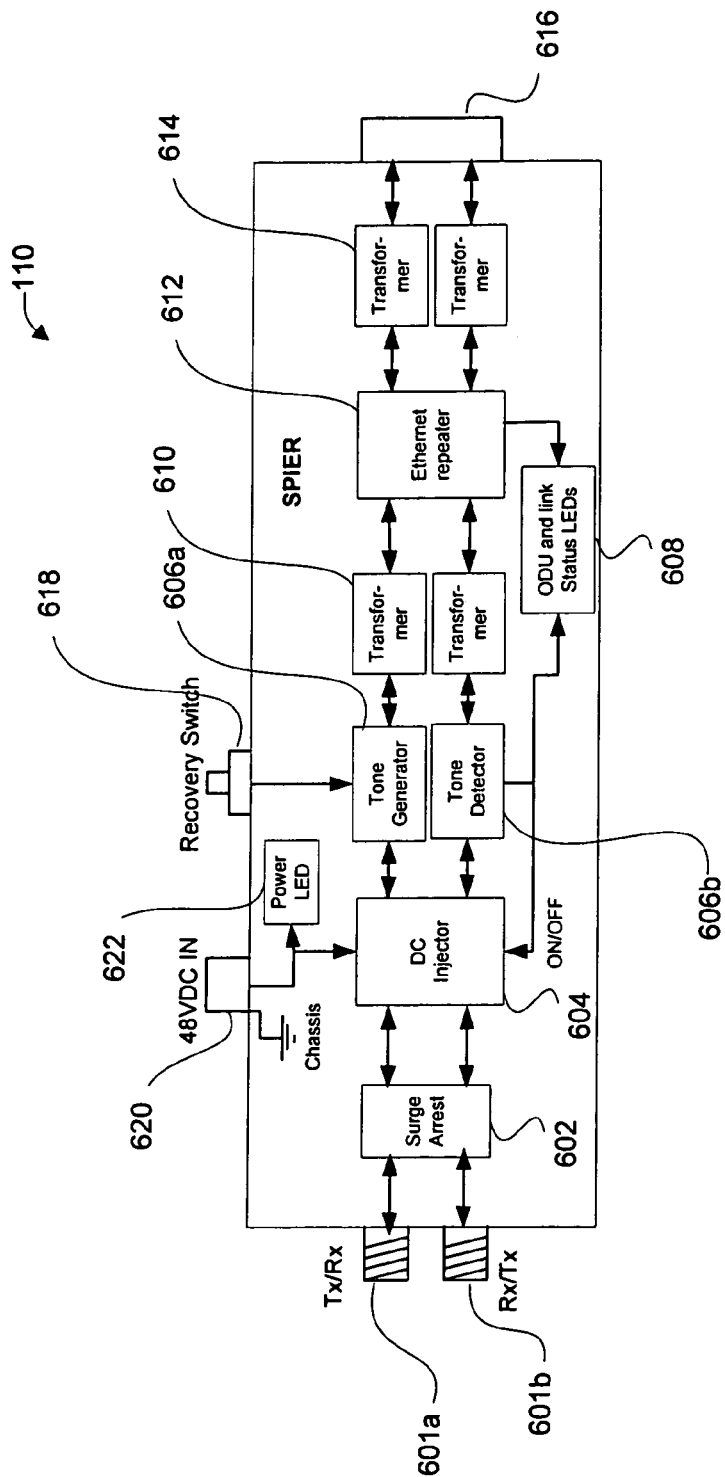
FIG. 6 is a diagrammatic representation of the SPIER of FIG. 1 in accordance with one implementation of the present invention.

FIG. 6 is a diagrammatic representation of the SPIER 110 of FIG. 1 in accordance with one implementation of the present invention. Any suitable combination of hardware and software may be implemented for performing the SPIER techniques of the present invention. In the illustrated embodiment, the SPIER 110 includes two coaxial interfaces 601a and 601b for communicating between the SPIER and the ODU. Power may also be applied onto these coaxial interfaces to the ODU. As shown, the SPIER 110 also includes a DC (direct current) injector 604 for injecting power which is input to power input 620 and through surge arrest block 602 onto coaxial cable 601a and 601b. The DC injector 604 may include any suitable number of processors or memory for implementing the techniques of powering up an ODU, and initializing a configuration or image recovery and the ODU as described above.

The SPIER 110 may also include one or more tone generators for applying one or more tones to one or more of the coaxial cables. The SPIER 110 may also include one or more transformers 610 and 614 for isolating the various received or transmitted signals. The SPIER 110 may also include an Ethernet repeater 612 for performing the Ethernet repeater operations described above. The SPIER 110 may also include one or more LEDs 608 for indicating the status of the ODU as well as the link status between the ODU and SPIER as further described below. The SPIER 110 may also include a power LED 622 for indicating when power is being input to the SPIER. The SPIER also may include a recovery switch 618 for initializing a configuration recovery or image recovery procedure as described above. Of course, any suitable interface mechanism may be used, and preferably such interface does not rely on a network connect to the SPIER or ODU. The SPIER 110 can also include a network interface 616 for interfacing with the various components of the SPIER, as well as the ODU.

One or more of the illustrated components of FIG. 6 may include one or more processors, such as the Motorola family of microprocessors or the MIPS family of microprocessors. In an alternative embodiment, one or more of the processors are specially designed hardware for controlling the operations of bridge. In a specific embodiment, one or more memory (such as non-volatile RAM and/or ROM) also forms part of each processor. However, there are many different ways in which memory could be coupled to the system. Each memory block may be used for a variety of purposes such as, for example, caching and/or storing data, programming instructions, etc.

Although the system shown in FIG. 6 is one specific SPIER of the present invention, it is by no means the only SPIER architecture on which the present invention can be implemented. For example, an architecture having a single processor that handles all the computational tasks may be used. Further, other types of interfaces and media could also be used with the SPIER.

Regardless of SPIER device's configuration, it may employ one or more memories or memory modules configured to store data, program instructions for the general-purpose network operations and/or the inventive techniques described herein. The program instructions may control the operation of an operating system and/or one or more applications, for example. The memory or memories may also be configured to store recovery button status and duration information, LED status information, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

FIG. 7A is a table 700 illustrating the various states of an Status LED of the SPIER in accordance with one embodiment of the present invention. When the ODU has completed its POST operation and loaded its software image, the status LED displays a steady green color. When a DC power is applied to the ODU and the ODU is currently in the process of loading its software or going through its POST, the status LED blinks green. When the ODU is not yet discovered (e.g., the discovery tone has not been returned), the DC power is not applied and the status LED blinks amber.

If the recovery button has been pressed more than two seconds and less than twenty seconds, the ODU is in configuration recovery mode and the status LED is a steady amber also. If the recovery button has been pressed for more than twenty seconds, the ODU is in an image recovery mode and downloading a new image and the status LED is a steady red color. Other conditions may also have to be met to indicate a configuration or image recovery mode. For instance, in one implementation the configuration and/or image recovery modes may only be initiated during a powering up of the SPIER and not during normal operation of the SPIER, such as normal data communication operations between the SPIER and ODU.

FIG. 7B is a table 702 listing the configurations of the power LED of the SPIER in accordance with one implementation of the present invention. If the power LED is black, no DC power is being applied to the SPIER. If the power LED is a steady green, DC power is being applied to the SPIER.

Figure 8:
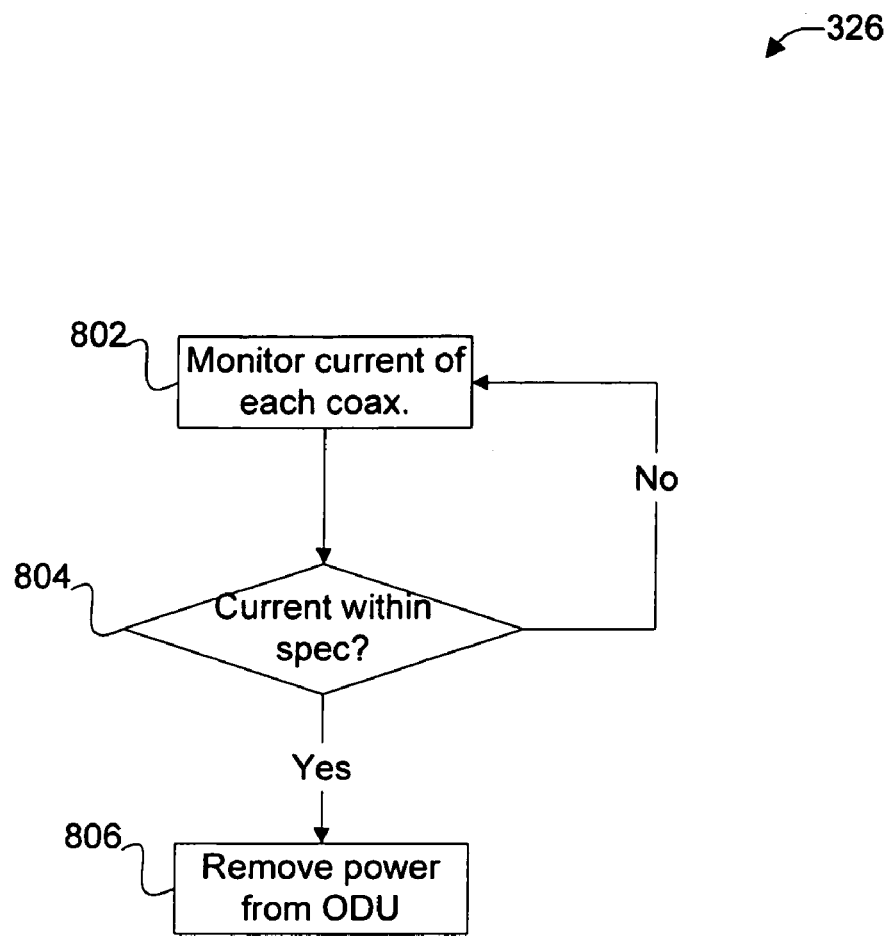
FIG. 8 is a flowchart illustrating the procedure of FIG. 3 for monitoring the current of each coaxial cable in accordance with one embodiment of the present invention.

FIG. 8 is a flowchart illustrating the procedure 326 of FIG. 3 for monitoring the current of each coaxial cable in accordance with one embodiment of the present invention. Initially, the current is monitored in each coaxial cable in operation 802. It is then determined whether the current is within specification. For example, it is determined whether a short or an open has occurred on one of the coaxial cables. If the current is not within specification, power is removed from the ODU in operation 806. If the current is within specification, the current continues to be monitored in operation 802. A first color may be displayed on the Link Status LED of the SPIER to indicate that power is being applied to the ODU and a second color is displayed to indicate that power has been removed.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for managing a first component of a wireless network using a second component of the wireless network, the method comprising:
   when a configuration recovery mode is selected manually via a physical interface of the second component without accessing a network interface of the second component, sending a configuration signal from the second component to the first component, wherein the configuration signal specifies that the first component is to perform a reconfiguration, and
   when an image recovery mode is selected manually at the second component without accessing the network interface of the second component, sending an image recovery signal from the second component to the first component, wherein the image recovery signal specifies that the first component is to initiate an operation for downloading new software to the first component,
   wherein the manual selection of the configuration recovery mode is performed by pressing a recovery button for a first time period and the manual selection of the image recovery mode is performed by pressing a recovery button for a second time period which differs from the first time period.

2. A method as recited in claim 1, further comprising:
   when the configuration signal is sent by the second component to the first component, determining whether the first component has successfully completed the reconfiguration and displaying at the second component an indication as to whether the first component has successfully completed the reconfiguration.

3. A method as recited in claim 1, wherein the reconfiguration includes loading a factory default configuration into the first component.

4. A method as recited in claim 1, further comprising:
   when the image recovery signal is sent by the second component to the first component, determining whether the first component has successfully initiated the new software download operation and displaying at the second component an indication as to whether the first component has successfully initiated the new software download operation.

5. A method as recited in claim 1, wherein the new software download operation includes downloading new software from the second component to the first component.

6. A method as recited in claim 1, wherein the configuration signal is a periodic signal sent for a time period corresponding to the pressing of the recovery button for the first time period and the image recovery signal is a periodic signal sent for a time period corresponding to the pressing of the recovery button for the second time period.

7. A method as recited in claim 1, wherein the configuration recovery mode and image recovery mode may only be manually selected during a powering up of the second component.

8. A method for managing a first component of a wireless network using a second component of the wireless network, the method comprising:
   when a configuration recovery mode is selected manually via a physical interface of the second component without accessing a network interface of the second component, sending a configuration signal from the second component to the first component, wherein the configuration signal specifies that the first component is to perform a reconfiguration;
   when an image recovery mode is selected manually at the second component without accessing the network interface of the second component sending an image recovery signal from the second component to the first component, wherein the image recovery signal specifies that the first component is to initiate an operation for downloading new software to the first component, wherein the configuration recovery mode and image recovery mode may only be manually selected during a powering up of the second component;
   upon powering up the second component, disabling power from being injected from the second component to the first component and sending a discovery signal to the first component;
   after the discovery signal is returned by the first component to the second component, injecting power from the second component into the first component;
   after the discovery signal is sent to the first component and when the discovery signal is not returned by the first component, continuing to disable power to the first component;
   wherein the configuration signal is sent by maintaining the discovery signal for a first time period after injecting power into the first component and the image recovery signal is sent by maintaining the discovery signal for a second time period after injecting power into the first component; and
   when power has been injected into the second component and (i) when the configuration recovery mode and the image recovery mode are not selected manually or (ii) after the configuration signal is sent in the form of the discovery signal, removing the discovery signal from being sent to the first component.

9. A method as recited in claim 8, wherein the first and second time periods for maintaining the discovery signal correspond to a time for which the configuration mode or image recovery mode is manually selected, respectively, the method further comprising:
   after the discovery signal is removed, sending a second discovery signal from the second component to the first component which is not detectable by the first component; and when the second discovery signal is not returned to the second component, displaying at the second component an indication that the first component has completed its initialization procedures.

10. A method as recited in claim 9, further comprising:

after injecting power into the first component, at the second component monitoring the connection between the first and second component; and when a failure is detected in the connection between the first and second components, disabling power injection from the second component to the first component.

11. A method as recited in claim 10, further comprising displaying at the second component an indication that power to the first component has been disabled.

12. A first apparatus operable to manage a second apparatus of a wireless network, the computer system comprising:

a physical interface;

one or more processors;

one or more memory, wherein at least one of the processors or memory is adapted for:

when a configuration recovery mode is selected manually via the physical interface of the first apparatus without accessing a network interface of the first apparatus, sending a configuration signal from the first apparatus to the second apparatus, wherein the configuration signal specifies that the second apparatus is to perform a reconfiguration; and when an image recovery mode is selected manually at the first apparatus without accessing the network interface of the first apparatus, sending an image recovery signal from the first apparatus to the second apparatus, wherein the image recovery signal specifies that the second apparatus is to initiate an operation for downloading new software to the second apparatus, wherein the manual selection of the configuration recovery mode is performed by pressing a recovery button for a first time period and the manual selection of the image recovery mode is performed by pressing a recovery button for a second time period which differs from the first time period.

13. A first apparatus as recited in claim 12, wherein the at least one of the processors or memory is further adapted for:

when the configuration signal is sent by the first apparatus to the second apparatus, determining whether the second apparatus has successfully completed the reconfiguration and displaying at the first apparatus an indication as to whether the second apparatus has successfully completed the reconfiguration.

14. A first apparatus as recited in claim 12, wherein the at least one of the processors or memory is further adapted for:

when the image recovery signal is sent by the first apparatus to the second apparatus, determining whether the second apparatus has successfully initiated the new software download operation and displaying at the first apparatus an indication as to whether the second apparatus has successfully initiated the new software download operation.

15. A first apparatus as recited in claim 12, wherein the at least one of the processors or memory is further adapted for running Ethernet signals on outdoor rated coaxial cables coupled to the first apparatus, wherein the outdoor rated coaxial cables are also coupled to the second apparatus.

16. A first apparatus as recited in claim 15, wherein the at least one of the processors or memory is further adapted for converting Ethernet signals coming from an indoor network device coupled to the first apparatus through a Cat5 into Ethernet signals on outdoor rated coaxial cables.

17. A first apparatus as recited in claims 16, wherein the outdoor rated coaxial cables are 75 ohm CaTV type coax cables.

18. A first apparatus as recited in claim 17, wherein the at least one of the processors or memory is further adapted for transmitting and receiving data on the outdoor rated coaxial cables at a rate selected from a group consisting of 10 Mbps, 100 Mbps, 1 Gbps, and 10 Gbps.

19. A first apparatus operable to manage a second apparatus of a wireless network, the computer system comprising:

a physical interface;

one or more processors;

one or more memory, wherein at least one of the processors or memory is adapted for:

when a configuration recovery mode is selected manually via the physical interface of the first apparatus without accessing a network interface of the first apparatus, sending a configuration signal from the first apparatus to the second apparatus, wherein the configuration signal specifies that the second apparatus is to perform a reconfiguration;

when an image recovery mode is selected manually at the first apparatus without accessing the network interface of the first apparatus, sending an image recovery signal from the first apparatus to the second apparatus, wherein the image recovery signal specifies that the second apparatus is to initiate an operation for downloading new software to the second apparatus, wherein the configuration recovery mode and image recovery mode may only be manually selected during a powering up of the first apparatus;

upon powering up the first apparatus, disabling power from being injected from the first apparatus to the second apparatus and sending a discovery signal to the second apparatus;

after the discovery signal is returned by the second apparatus to the first apparatus, injecting power from the first apparatus into the second apparatus;

after the discovery signal is sent to the second apparatus and when the discovery signal is not returned by the second apparatus, continuing to disable power to the second apparatus;

wherein the configuration signal is sent by maintaining the discovery signal for a first time period after injecting power into the second apparatus and the image recovery signal is sent by maintaining the discovery signal for a second time period after injecting power into the second apparatus; and when power has been injected into the second apparatus and (i) when the configuration recovery mode and the image recovery mode are not selected manually or (ii) after the configuration signal is sent in the form of the discovery signal, removing the discovery signal from being sent to the second apparatus.

20. A first apparatus as recited in claim 19, wherein the first and second time periods for maintaining the discovery signal correspond to a time for which the configuration mode or image recovery mode is manually selected, respectively, wherein the at least one of the processors or memory is further adapted for:

after the discovery signal is removed, sending a second discovery signal from the first apparatus to the second apparatus which is not detectable by the second apparatus; and when the second discovery signal is not returned to the first apparatus, displaying at the first apparatus an indication that the second apparatus has completed its initialization procedures.

21. A first apparatus as recited in claim 20, wherein the at least one of the processors or memory is further adapted for:
after injecting power into the second apparatus, at the first apparatus monitoring the connection between the first and second apparatus; and
when a failure is detected in the connection between the first and second apparatus disabling power injection from the first apparatus to the second apparatus.

22. A first apparatus as recited in claim 21, wherein the at least one of the processors or memory is further adapted for displaying at the first apparatus an indication that power to the second apparatus has been disabled.

23. A computer program product for managing a first component of a wireless network using a second component of the wireless network, the computer program product comprising:
at least one computer readable medium;
computer program instructions stored within the at least one computer readable product configured for:
when a configuration recovery mode is selected manually via a physical interface of the second component without accessing a network interface of the second component, sending a configuration signal from the second component to the first component, wherein the configuration signal specifies that the first component is to perform a reconfiguration; and
when an image recovery mode is selected manually via the physical interface of the second component without accessing the network interface of the second component, sending an image recovery signal from the second component to the first component, wherein the image recovery signal specifies that the first component is to initiate an operation for downloading new software to the first component,
wherein the manual selection of the configuration recovery mode is performed by pressing a recovery button for a first time period and the manual selection of the image recovery mode is performed by pressing a recovery button for a second time period which differs from the first time period.

24. A computer program product as recited in claim 23, the computer program instructions stored within the at least one computer readable product being further configured for:
when the configuration signal is sent by the second component to the first component, determining whether the first component has successfully completed the reconfiguration and displaying at the second component an indication as to whether the first component has successfully completed the reconfiguration.

25. A computer program product as recited in claim 23, wherein the reconfiguration includes loading a factory default configuration into the first component.

26. A computer program product as recited in claim 23, the computer program instructions stored within the at least one computer readable product being further configured for:
when the image recovery signal is sent by the second component to the first component, determining whether the first component has successfully initiated the new software download operation and displaying at the second component an indication as to whether the first component has successfully initiated the new software download operation.

27. A computer program product as recited in claim 23, wherein the new software download operation includes downloading new software from the second component to the first component.

28. A computer program product as recited in claim 23, wherein the configuration signal is a periodic signal sent for a time period corresponding to the pressing of the recovery button for the first time period and the image recovery signal is a periodic signal sent for a time period corresponding to the pressing of the recovery button for the second time period.

29. A computer program product for managing a first component of a wireless network using a second component of the wireless network, the computer program product comprising:
at least one computer readable medium;
computer program instructions stored within the at least one computer readable product configured for:
when a configuration recovery mode is selected manually via a physical interface of the second component without accessing a network interface of the second component, sending a configuration signal from the second component to the first component, wherein the configuration signal specifies that the first component is to perform a reconfiguration; and
when an image recovery mode is selected manually via the physical interface of the second component without accessing the network interface of the second component, sending an image recovery signal from the second component to the first component, wherein the image recovery signal specifies that the first component is to initiate an operation for downloading new software to the first component,
wherein the configuration recovery mode and image recovery mode may only be manually selected during a powering up of the second component;
upon powering up the second component, disabling power from being injected from the second component to the first component and sending a discovery signal to the first component;
after the discovery signal is returned by the first component to the second component, injecting power from the second component into the first component;
after the discovery signal is sent to the first component and when the discovery signal is not returned by the first component, continuing to disable power to the first component;
wherein the configuration signal is sent by maintaining the discovery signal for a first time period after injecting power into the first component and the image recovery signal is sent by maintaining the discovery signal for a second time period after injecting power into the first component; and
when power has been injected into the second component and (i) when the configuration recovery mode and the image recovery mode are not selected manually or (ii) after the configuration signal is sent in the form of the discovery signal, removing the discovery signal from being sent to the first component.

30. A computer program product as recited in claim 29, wherein the first and second time periods for maintaining the discovery signal correspond to a time for which the configuration mode or image recovery mode is manually selected, respectively, the computer program instructions stored within the at least one computer readable product being further configured for:

after the discovery signal is removed, sending a second discovery signal from the second component to the first component which is not detectable by the first component; and when the second discovery signal is not returned to the second component, displaying at the second component an indication that the first component has completed its initialization procedures.

31. A computer program product as recited in claim 30, the computer program instructions stored within the at least one computer readable product being further configured for:

after injecting power into the first component, at the second component monitoring the connection between the first and second component; and when a failure is detected in the connection between the first and second components, disabling power injection from the second component to the first component.

32. A computer program product as recited in claim 31, further comprising displaying at the second component an indication that power to the first component has been disabled.

33. An apparatus for managing a first component of a wireless network using a second component of the wireless network, comprising:

means for when a configuration recovery mode is selected manually via a physical interface at the second component without accessing a network interface of the second component, sending a configuration signal from the second component to the first component, wherein the configuration signal specifies that the first component is to perform a reconfiguration;

means for when an image recovery mode is selected manually at the second component without accessing the network interface of the second component, sending an image recovery signal from the second component to the first component, wherein the image recovery signal specifies that the first component is to initiate an operation for downloading new software to the first component, wherein the manual selection of the configuration recovery mode is performed by pressing a recovery button for a first time period and the manual selection of the image recovery mode is performed by pressing a recovery button for a second time period which differs from the first time period.

* * * * *